May 17, 1966 H. A. HARTLEY 3,251,921
METAL HEATING AND CIRCULATING APPARATUS
Filed March 22, 1963 2 Sheets-Sheet 1

INVENTOR.
Harry H. Hartley.
BY
Harness, Dickey & Pierce
ATTORNEYS.

May 17, 1966 H. A. HARTLEY 3,251,921
METAL HEATING AND CIRCULATING APPARATUS
Filed March 22, 1963 2 Sheets-Sheet 2

INVENTOR.
Harry A. Hartley.
BY
Harness, Dickey & Pierce,
ATTORNEYS.

United States Patent Office 3,251,921
Patented May 17, 1966

3,251,921
METAL HEATING AND CIRCULATING
APPARATUS
Harry A. Hartley, 950 E. Maple Drive,
Birmingham, Mich.
Filed Mar. 22, 1963, Ser. No. 267,159
18 Claims. (Cl. 13—28)

This invention relates to metal heating and circulating apparatus.

Molten metal can be heated in an induction furnace having heating and circulating apparatus which is conventionally fixed to and is at least partially integral with the furnace structure. When the furnace is being repaired, i.e., relined, etc., the heating and circulating apparatus cannot be used. It is an object of this invention to provide metal heating and circulating apparatus which is portable and separable from the heating vessel and which is not restricted for use with one heating vessel but which can be used with any vessel desired.

Conventionally, metal is heated at the bottom or in the hearth of induction heating vessels. The metal heating and circulating means of the present invention is used at the top of the vessel and near the surface of the molten metal. This apparatus need not be attached to the vessel. Thus the following advantages are realized: (1) The apparatus can be portable and need not be restricted for use with only one vessel, (2) the apparatus can be used with vessels of any size or shape, and (3) the structure of the vessel can be simplified since no channels in the vessel are required and also no means for holding the heating and circulating apparatus are required on the vessel. Thus it is another object of this invention to provide metal heating and circulating apparatus which is used promixate the surface of the molten metal in a vessel and can be used with vessels having a simplified construction in contrast to prior art furnaces.

In an induction furnace of the submerged core-type resistor construction, a primary winding located at the bottom of the hearth is used to induce a short circuit current in a secondary circuit of molten metal. The fluid path for the molten metal in the secondary circuit is defined by channels which are formed through a section of refractory material which is integral with the refractory lining of the hearth of the furnace. An example of this type of structure is shown in the U.S. patent to Tama, No. 2,536,325, issued January 2, 1951. As the molten metal flows through the channels, the walls of the channels are scrubbed and washed. With some metals this results in an erosion of the walls of the channels while, with other metals, an oxide or other deposit is formed which blocks the channels. In either case the lining life of the channels is considerably less than the lining life of the remainder of the furnace. This difference in lining life may be in the order of from 1 to 3 to 1 to 10. Since the furnace must be shut down to repair the inductor lining, valuable time is lost due to the necessity of shutting down the furnace to repair such lining. In addition, the channels are normally formed with the use of molds and ramming tools and frequently require several weeks for drying. Thus the relining of the furnaces is both costly and time consuming. In the present invention the repair of the furnace is simplified and down time is reduced. I provide channels for the molten metal in the secondary electrical circuit which are in a unit separate from the lining of the furnace body. Therefore, it is an object of this invention to provide an induction furnace which is an improvement of the submerged resistor type and which has a novel construction and in which the down time required for repair of the furnace as a result of channel lining deterioration is reduced.

In an induction furnace of the coreless type, induction heating principles are utilized to provide heat to the charge. With conventional coreless type induction furnaces, an electrical coil is wounnd around and is fixed to the melting chamber or hearth and eddy currents are induced in the charge to provide heat. The coreless type furnace is different in construction and operation from the submerged resistor type; examples of each can be seen in "Standard Handbook for Electrical Engineers," 8th ed., § 179–194. In the present invention it is proposed to provide heating and circulating apparatus formed by a separate channel defining unit within which molten metal is heated by induction heating principles to provide heat to the charge, and also to circulate the charge within the vessel.

It is an object of this invention to provide such an induction furnace of the coreless type having heating and circulating apparatus including a channeled heat unit which is separate from the metal-containing vessel and in which the complete heating unit can be easily and quickly replaced. Another advantage of this improved structure is that the unit may simply be lifted from the bath sufficiently to permit a quick cleaning out of the channel by means of a cleaning rod or drill while the metal remains molten in the bath.

In the present invention as applied to either type of induction furnace discussed, a unitary heating assembly, including the channel member, is used which is located appurtenant to the surface of the molten metal in the hearth and the molten metal is circulated through and heated within the channel member. The heating assembly can be moved relative to the hearth to accommodate various levels of molten metal. As previously noted, the heating assembly of this invention can be made portable and can be used with numerous kinds of vessels or containers capable of holding molten metal. Therefore, it is another object of this invention to provide a novel metal heating and circulating structure which is movable relative to the heating vessel and is portable and can be used with numerous kinds of containers capable of holding molten metal.

Other objects, features, and advantages of the present invention will become apparent from the subsequent description and the appended claims, taken in conjunction with the accompanying drawings, in which:

Figure 1:
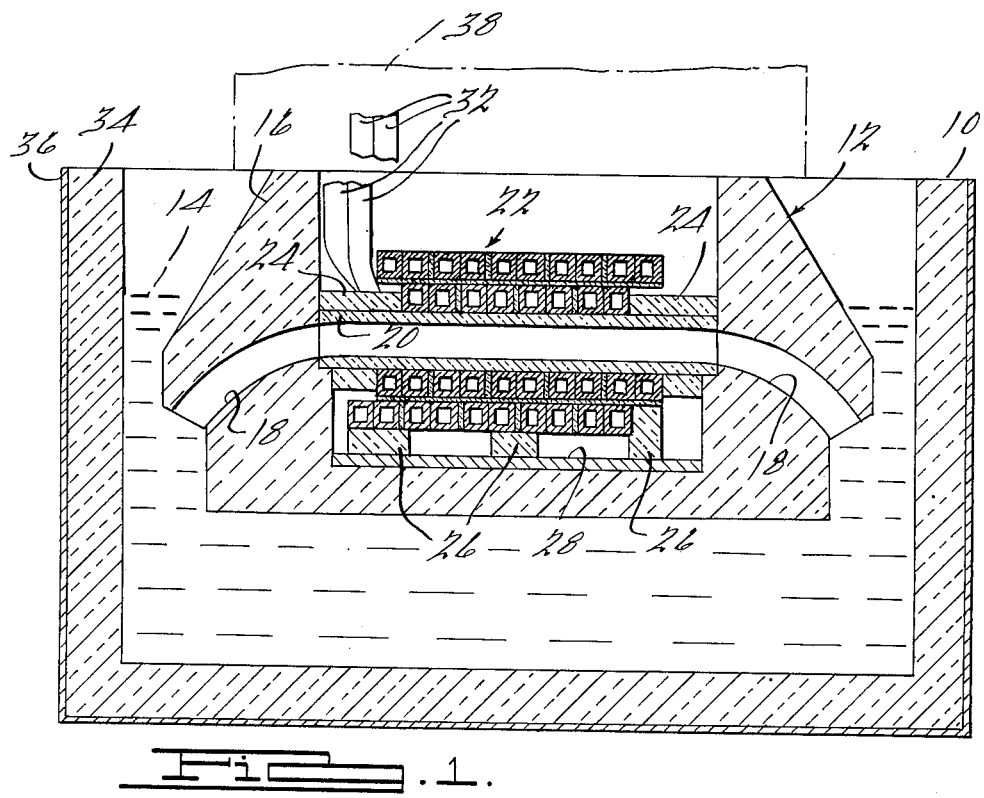
FIGURE 1 is a cross-sectional view of an assembly depicting a heating vessel and a preferred embodiment of the metal heating and circulating apparatus of this invention.

Looking now to FIGURE 1, a vessel for holding molten metal, generally indicated as 14, is shown in relation to a heating and circulating apparatus assembly 12 which is designed to float at the surface of the metal 14. The assembly 12 has a dished preformed refractory housing 16 which is floatable and is opened at the top and which is provided with a pair of diametrically oppositely disposed, downwardly directed passageways 18. A readily replaceable tube or channel member 20 of refractory material is located within the housing 16 and is in fluid communication with the passageways 18 and has an electrical coil 22 coaxially disposed thereon intermediate its ends. The coil 22 is preferably water cooled by conventional means (not shown). Refractory sealing collars 24 are located about the ends of the tube 20 and are cemented or otherwise secured to the ends of the tube 20 and the internal surface of the housing 16 to provide a fluid tight seal between the passageways 18 and the tube 20. Refractory coil supports 26 are located on a ceramic heat insulating liner 28 at the bottom of the housing 16 and support the coil 22. The coil 22 is energized by means of a pair of lead wires 32 which can also be water cooled in a conventional manner (not shown).

It will be appreciated that where certain molten metals (e.g., magnesium) are involved, components above specified as formed of refractory material could instead be formed of a suitable metal. Further, it will be appreciated that the heating unit, instead of being buoyantly floated, might be held in position by suitable mechanical suspension means.

In operation the heating and circulating assembly 12 is placed in a vessel 10 having a ceramic lining 34 and an outer metal shell 36. The assembly 12 will float at the surface of the metal 14 with the housing 16 partially submerged until the level of the metal 14 is higher than the passageways 18 and the tube 20 and hence flows therethrough. Depending upon the weight of the assembly 12, the shape of the housing 16, and the density of the metal 14 ceramic weights 38 can be added to the assembly 12 to insure that the metal 14 will completely fill the tube 20 via passageways 18. Thus a secondary electrical circuit is created by the molten metal 14 in the vessel 10 and in the tube 20 and passageways 18. As the coil 22 is energized from a suitable source of alternating potential eddy currents are induced in the secondary circuit. The amount of heat added to the molten metal 14 will be in accordance with the magnitude of the induced current. The electromagnetic effect of the coil 22 causes the metal to flow through the tube 20 and hence to be circulated in the vessel 10. This circulation of molten metal results in temperature uniformity and in a homogeniety in the mixture of the metal 14.

In the event of deterioration of the tube 20 as the result of the flow of molten metal therethrough, that component can be readily replaced and the assembly 12 can again be made ready for use.

It is important to note that the heating and circulating apparatus assembly 12 is portable and readily removable from the vessel 10. Thus the assembly 12 can readily be moved from one vessel to another as required. Note also that the vessel 10 can be of the simplest construction and needs no special structure to receive assembly 12.

In the assembly 12, the passageways 18 are turned downwardly. Thus in a vessel in which the passageways 18 terminate near the lining of the vessel, the flow of metal is directed downwardly and not toward the lining thereby preventing lining erosion due to scrubbing.

Figure 2:
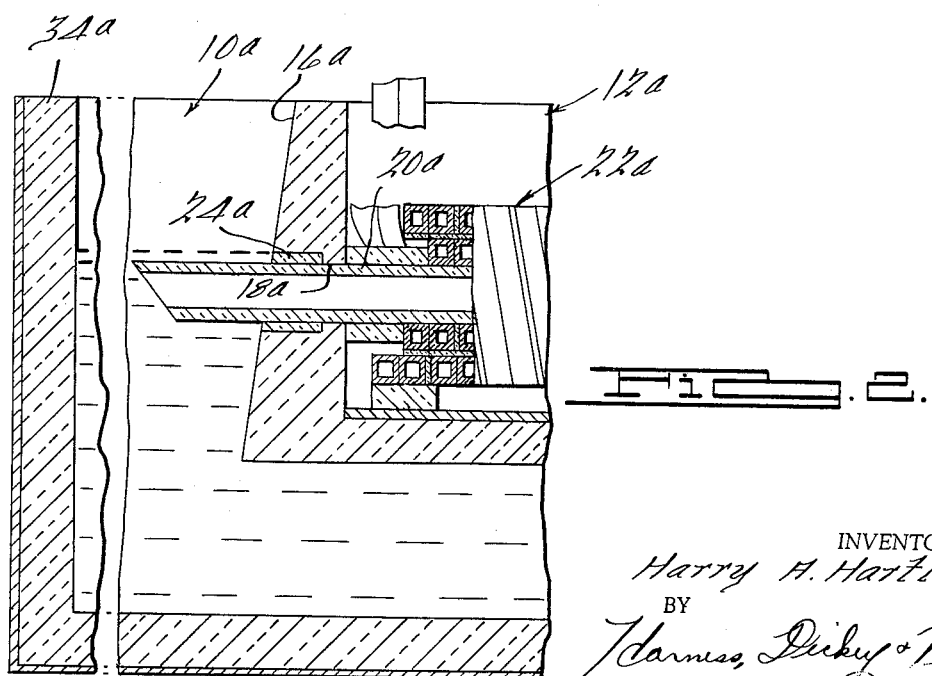
FIGURE 2 is a fragmentary view similar to that of FIGURE 1 depicting metal heating and circulating apparatus of a modified construction.

A modification of the above described embodiment is shown in FIGURE 2 in which similar components are given the same numerical designation with the addition of a letter subscript. Thus in FIGURE 2, a metal heating and circulating assembly 12a is shown in relation to a vessel 10a. The assembly 12a has a refractory, floatable housing 16a with a straight tube 20a extending thereacross and outwardly through a pair of apertures 18a. A water-cooled coil 22a is located about the tube or channel member 20a. A refractory sealing collar 24a is disposed in a counterbore in the outer end of each aperture 18a and is cemented or otherwise secured to both the housing 16a and the tube 20a to provide a fluid tight seal therebetween. The operation of the assembly 12a is similar to that of assembly 12. Note that the ends of the tube 20a extend straight out and hence discharge the molten metal directly towards the lining 34a of the vessel 10a; therefore the assembly 12a is preferably for use in a vessel 10a in which the discharge ends of tube 20a will be located a sufficient distance from the lining 34a to minimize scrubbing and erosion. As with the embodiment of FIGURE 1, the tube 20a can readily be cleaned or removed and replaced as required.

Figure 3:
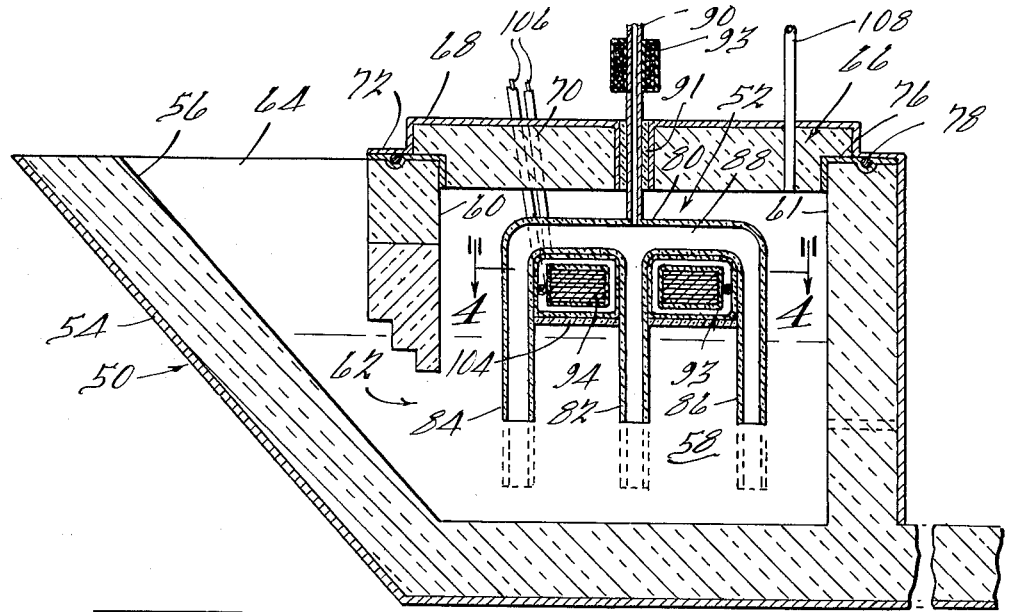
FIGURE 3 is a substantially longitudinal, cross-sectional view of an induction furnace, including a furnace body assembly and a further modification of metal heating and circulating apparatus of this invention.
Figure 4:
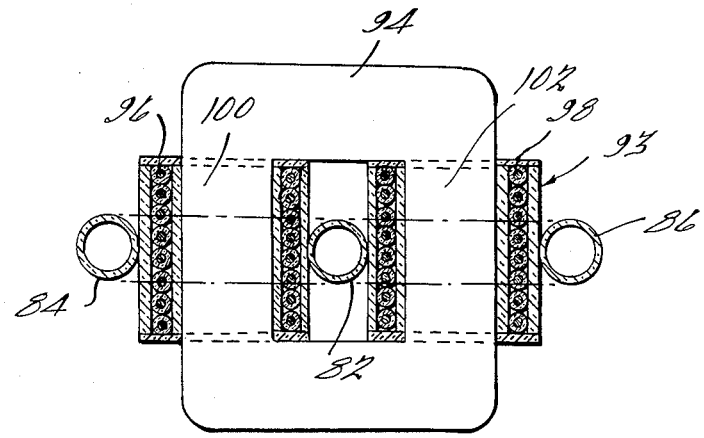
FIGURE 4 is an enlarged sectional view taken substantially along the line 4—4 of FIGURE 3.

FIGURES 3 and 4 show an induction furnace equipped with still another form of metal heating and circulating means. The furnace body or vessel is generally designated 50 and the metal heating and circulating assembly is generally designated 52. The vessel 50 has a simple refractory lining 56. The furnace body 10 has a melting chamber 58 which is defined by a pair of longitudinally spaced, generally transversely extending vertical walls 60 and 61. While only one chamber 58 is shown, an induction furnace could be constructed having a plurality of similar chambers. The outermost wall 60 is located near one end of the furnace body and defines therewith a charge receiving section 64 which is in communication with the hearth 58 via a passageway or opening 62 beneath the wall 60.

The hearth 58 is closed at its upper end by a cover member 66 which is constructed of a steel outer shell 68 and a refractory lining 70. A steel band or ring 76 is peripherally disposed upon the upper ends of the walls, including walls 60 and 61, defining the chamber 58 and is provided with a peripheral groove having a sealing member 78 disposed therein. The lining 70 is of a stepped construction and extends partially into chamber 58 while the outer shell 68 has a flange 72 which is engageable with the seal 78 to thereby seal the top of the chamber 58. Movably secured relative to the cover member 66 is the metal heating and circulating assembly 52.

The assembly 52 includes a channel member 80 which is constructed of ceramic or of some other suitable material and which has three parallel, vertically oriented, tubular leg portions or channels 82, 84 and 86. The leg portion 82 is located centrally between leg portions 84 and 86 and a horizontally extending tubular portion or channel 88 fluid communicates each of the leg portions 82, 84 and 86 at their upper ends. The channels through the channel member 80 have a generally circular cross-sectional area. A tube 90 is connected to the tubular portion 88 oppositely from the center leg portion 82 and extends vertically through the cover member 66 and through an annular seal 91 supported in the cover member 66, whereby the channel member 80 may either be vented to atmosphere or connected to vacuum generating means. A heating coil 93 located intermediate the seals 91 in the cover 66 encircles a portion of tube 90 and can be energized to heat the tube 90 to prevent metal from freezing or solidifying therein.

A primary coil assembly or inductor 93 has a rectangular, laminated magnetic core 94 extending around the center leg portion 82 proximate to the horizontal portion 88. Each of a pair of electrical primary windings 96 and 98 is wound on a separate one of a pair of opposite legs 100 and 102, respectively, of core 94, with the legs 100 and 102 disposed between adjacent ones of leg portions 82, 84 and 86. Electrical insulation is disposed about the radially inner and outer surfaces of the windings 96 and 98 and a refractory and insulating member 104 is located on the lower extremity of the windings 96 and 98 to protect them from the molton metal in the hearth 58. A plurality of electrical leads, indicated by the dotted lines 106 are connected to windings 56 and 58 and are extended through the cover 66 for connection to a suitable source of alternating potential for energizing the windings 96 and 98. The input leads 106 can be water-cooled by conventional means (not shown); likewise, the core 94 can be air or water-cooled by conventional means (not shown).

A pressure tube 108 extends through the cover 66 and into communication with the chamber 58 and can be connected to a source of air or other suitable gas under pressure. In operation, a charge is disposed in the hearth 58 via the input section 64 through the passageway 62. The chamber 58 is then pressurized via pressure tube 108. Since the channel member 80 is at atmospheric pressure or less, the molten metal, under pressure, rises into the leg portions 82, 84, 86 and into the horizontal portion 88. Likewise, the molten metal is caused to rise into the charge section 64 through the passageway 62. When the leg portions 82, 84 and 86 and the tubular portion 88 of the channel member 80 are filled with molten metal, a continuous secondary electrical circuit is defined by the molten metal in the channel member 80 and by the remainder of the molten metal in the chamber 58. As can best be seen in FIGURE 3, this secondary circuit forms closed loops about the core 94. Thus, when the primary windings 96 and 98 are energized, a short circuit current is induced in this secondary circuit of the molten metal. The induced current is provided to be of a high enough magnitude to cause heating of the molten metal in the leg portions 82, 84 and 86 and in the tubular portion 88. While heat is generated within the channels of the channel member 80, electromagnetic forces cause the heated metal in the channels to be circulated in the chamber 58. This circulation results in the metal in the chamber attaining a uniform temperature and also homogeniety of the mixture. By controlling the magnitude of the primary current, the temperature of the metal in the chamber 58 can be maintained constant or can be controlled as desired. In addition, solid metal added through the charge section 64 can be melted with the additional heat for melting being provided by the induced secondary current.

The heating and circulating assembly 52 is movable vertically relative to the chamber 58 to compensate for different quantities of charge located therein. Specific means for moving the heating assembly 52 are not shown since such means are well known in the art and the particular details of such means do not constitute a part of this invention.

With the assembly as shown in the drawings, when the channel member 80 has deteriorated as a result of excessive erosion or excessive oxide deposition the entire channel member 80 can be easily and quickly removed and cleaned or replaced.

In an alternate mode of operation, the tube 108 can be vented to the atmosphere and the tube 90 can be connected to a vacuum pump. The pressure differential between the chamber 58 and the channel member 80 can be provided to be of a sufficient magnitude to cause the molten metal to flow into the channels 82, 84, 86 and 88.

With the heating assembly 52, literally any type of vessel capable of holding molten metal can be used. The features of the present invention are also readily applicable to any of a variety of furnaces including the tilting type, the stationary type in which the hearth is tapped or siphoned, or the stationary type in which the hearth is pressurized for metal disposal.

Figure 5:
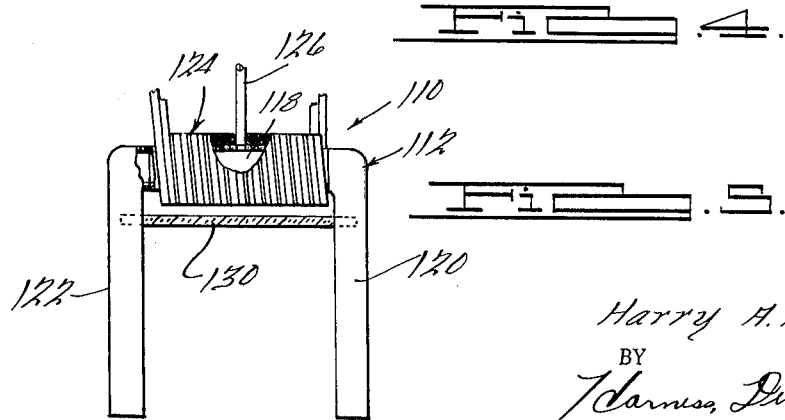
FIGURE 5 is a front view, with some parts shown in section and other parts shown broken away, of a still different modification of the metal heating and circulating apparatus of this invention.

A modified eating assembly 110 utilizing induction heating principles is shown in FIGURE 5. A U-shaped channel member 112, made of refractory or other suitable material is composed of a pair of L-shaped sections which have interfitting leg portions defining an intermediate or horizontal upper channel 118 and which have vertically extending leg portions 120 and 122. A coreless, water-cooled electrical winding 124 is wounded about the transverse upper channel 118. A tube 126 corresponding to previously described tube 90 is connected to the intermediate channel 118 and serves the same purpose as tube 90, previously described. A ceramic heat insulating shelf 130 is preferably secured to and located between leg portions 120 and 122 and protects the electrical winding 124 from the molten metal in the hearth. The heating and circulating assembly 110 can be moved relative to the hearth to compensate for different levels of molten metal in the hearth, as in the previous embodiment.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. As a new article of manufacture, a metal heating and circulating unit adapted to be inserted in a vessel to heat and circulate molten metal therein comprising a removable and disposable member having portions defining a channel having inlet and outlet extremities, said channel being of relatively small cross section throughout its length and defining the entire effective metal treating capacity of said unit, the extremities of the channel being submersible in molten metal, and means operatively connected to said member for heating the metal in said channel, said heating means being of a type which reacts directly upon metal in the channel to induce a flow of metal therethrough, and the member and channel-defining portions being arranged to divert metal from the main mass of metal in the rest of the vessel, and to isolate such diverted metal from said main mass except at said extremities.

2. The apparatus of claim 1 in which said heating means comprises an electrical coil and with said channel comprising a disposable and replaceable tube of a generally uniform cross section located coaxially within said electrical coil.

3. The apparatus of claim 2 in which said channel further includes passageways through said submerged portion of said unit in fluid communication with said tube and in which said channel is normally located below the surface of the molten metal in the vessel.

4. The apparatus of claim 3 further comprising sealing means including a collar member disposed about each end of said tube for providing a fluid tight seal between said tube and said passageways in said unit.

5. The apparatus of claim 2 in which said extremities of said channel are directed downwardly.

6. The apparatus of claim 2 in which said tube is supported in a pair of apertures in said housing and is in direct communication with the molten metal.

7. The apparatus of claim 6 further comprising sealing means including a collar member disposed in each of said apertures and about said tube for providing a fluid tight seal between said tube and said passageways in said housing.

8. Metal heating and circulating apparatus for heating and circulating molten metal in a receptacle comprising a removable and disposable channel-defining member separate from the receptacle and having at least three tubular legs in fluid communication with each other, said legs having open lower extremities submersible in metal in the receptacle, and means operatively connected to said channel-defining member for heating the metal in said channel.

9. Metal heating and circulating apparatus for heating and circulating molten metal in a metal-holding vessel comprising a removable and disposable channel-defining member adapted to be supported separately from the vessel and having open inlet and outlet portions for immersion in metal contained in the vessel, said member also defining a cross-connecting channel directly interconnecting the inlet and outlet and of a cross section small enough in proportion to the areas of the inlet and outlet to maintain a substantial velocity of flow of metal through the cross-connecting channel as well as through the inlet and outlet, and electrical induction means coupled to the cross connection-defining portion of said member for inducing circulation of metal through and heating the metal in said channel.

10. An induction furnace comprising a furnace body having a melting chamber for holding molten metal, metal heating and circulating apparatus supported for movement into and out of said melting chamber comprising a channel member separate from said furnace body and having a center and two outer tubular legs extending parallelly in said melting chamber and having a tubular portion connecting said legs in fluid communication with each other at one end, and means operative with said melting chamber and with said channel member for applying a relative pressure differential between said melting chamber and said channel member for moving the molten metal from said melting chamber into said channel member through said tubular legs for providing a secondary electrical circuit through the molten metal in said melting chamber and through the molten metal in said channel member, said metal heating and circulating apparatus further comprising electrical coil assembly means electrically operatively connected to said channel member and being actuatable from a source of alternating potential for inducing a secondary current through the metal in said secondary electrical circuit, said coil assembly means including a magnetic core radially extending about said center leg and a primary coil wound about said core.

11. An induction furnace comprising a furnace body having a melting chamber for holding molten metal, metal heating and circulating apparatus supported for movement into and out of said melting chamber comprising a disposable channel member separate from said furnace body and having a center and two outer tubular legs extending parallelly in said melting chamber and having a tubular portion connecting said legs in fluid communication with each other at one end, a cover member supported on said furnace body for sealing the top of said melting chamber, a vent tube connected to said channel member and extending through said cover member for communicating said channel member with the atmosphere, a pressure tube connected to said cover in communication with said melting chamber and being connectible to a source of gas under pressure for increasing the pressure on the molten metal in the melting chamber for moving the molten metal from said melting chamber into said channel member through said tubular legs for providing a secondary electrical circuit through the molten metal in said melting chamber and through the molten metal in said channel member, said metal heating and circulating apparatus further comprising electrical coil assembly means electrically operatively connected to said channel member and being actuatable from a source of alternating potential for inducing a secondary current through the metal in said secondary electrical circuit, said coil assembly means including a magnetic core radially extending about said center leg and a primary coil wound about said core.

12. The furnace of claim 11 further including heating means disposed proximate said vent tube for heating any metal located therein.

13. An induction furnace comprising a furnace body having a melting chamber for holding molten metal and a charge section for receiving the metal charge with said charge section having an opening in communication with said melting chamber, metal heating and circulating apparatus supported for movement into and out of said melting chamber comprising a disposable channel member separate from said furnace body and having a center and two outer tubular legs extending parallelly in said melting chamber and having a tubular portion connecting said legs in fluid communication with each other at one end, a cover member supported on said furnace body for sealing the top of said melting chamber, a vent tube connected to said channel member and extending through said cover member for communicating said channel member with the atmosphere, a pressure tube connected to said cover in communication with said melting chamber and being connectible to a source of gas under pressure for increasing the pressure on the molten metal in the melting chamber for moving the molten metal from said melting chamber into said channel member through said tubular legs for providing a secondary electrical circuit through the molten metal in said melting chamber and through the molten metal in said channel member, said metal heating and circulating means further comprising electrical coil assembly means electrically operatively connected to said channel member and being actuatable from a source of alternating potential for inducing a secondary current through the metal in said secondary electrical circuit, said coil assembly means including a magnetic core radially extending about said center leg and a primary coil wound about said core.

14. In combination with an article as defined in claim 1, means for suspending said unit in a bath of molten metal with said extremities of the channel submerged in the bath.

15. In combination with an article as defined in claim 1, means for suspending said unit in a bath of molten metal with said extremities of the channel submerged in the bath, said heating means being outside the channel and spaced above at least that portion of the surface of the bath which underlies the channel.

16. In combination with means as defined in claim 1, means for supporting said unit in a plurality of vertically spaced positions.

17. In combination with means as defined in claim 1, means defining an isolated riser passage communicating with and extending upwardly from said previously mentioned passage at a position spaced from said extremities, whereby different relative pressures may be applied to the interior of said first mentioned passage and to the main bath.

18. A unit as defined in claim 1 which displaces less than its own weight in molten metal and is therefore floatable thereon, said submersible extremities being positioned to lie entirely below the surface of metal on which the unit is floated.

References Cited by the Examiner
UNITED STATES PATENTS

| 1,640,826 | 8/1927 | Foley | 13—29 |
| 1,763,229 | 6/1930 | Fourment | 219—10.51 X |
| 2,411,409 | 11/1946 | Ballard | 219—10.65 |
| 2,513,779 | 7/1950 | Bailey | 219—10.51 |
| 3,019,275 | 1/1962 | Lorenz | 13—26 X |
| 3,098,887 | 7/1963 | Calamari | 13—29 |
| 3,107,268 | 10/1963 | Kraus | 219—10.65 |

FOREIGN PATENTS 642,200  12/1945  Great Britain.

ANTHONY BARTIS, *Acting Primary Examiner.*
RICHARD M. WOOD, *Examiner.*
L. H. BENDER, *Assistant Examiner.*